(12) United States Patent
Burns (10) Patent No.: US 7,459,633 B2
(45) Date of Patent: Dec. 2, 2008

(54) WIRE MANAGEMENT SYSTEM

(75) Inventor: Don R. Burns, Santa Fe Springs, CA (US)

(73) Assignee: Vantage Point Products Corp., Santa Fe Springs, CA (US)

( * ) Notice: Subject to any disclaimer, the term of this patent is extended or adjusted under 35 U.S.C. 154(b) by 0 days.

(21) Appl. No.: 11/773,235

(22) Filed: Jul. 3, 2007

(65) Prior Publication Data

US 2008/0011512 A1    Jan. 17, 2008

Related U.S. Application Data (60) Provisional application No. 60/830,489, filed on Jul. 11, 2006.

(51) Int. Cl.
*H02G 3/04* (2006.01)

(52) U.S. Cl. ............ 174/72 A; 174/480; 174/481; 174/95; 174/97; 52/220.7; 138/168; 439/207

(58) Field of Classification Search .......... 174/480, 174/481, 68.1, 68.2, 68.3, 72 A, 72 R, 99 R, 174/100, 95, 97; 439/120, 210, 212, 207; 220/3.92, 3.94; 52/220.7, 220.5; 312/257.1, 312/263; 138/168; 248/49, 68.1, 58
See application file for complete search history.

(56) References Cited

U.S. PATENT DOCUMENTS

| | | | |
|---|---|---|---|
| 291,170 A | 1/1884 | Edmunds, Jr. | |
| 1,277,550 A | 9/1918 | Connell | |
| 2,896,009 A | 7/1959 | Caveney | |
| 2,905,201 A | 9/1959 | McNaughton | |
| 2,982,570 A | 5/1961 | Lohman | |
| 3,161,722 A | 12/1964 | Wellens et al. | |
| 3,241,797 A | 3/1966 | Anderson | |
| 3,471,629 A | 10/1969 | O'Leary | |
| 3,890,459 A | 6/1975 | Caveney | |
| 4,136,257 A | 1/1979 | Taylor | |
| 4,484,020 A | 11/1984 | Loof et al. | |
| 4,951,716 A | 8/1990 | Tsunoda et al. | |
| 5,086,195 A | 2/1992 | Claisse | |
| 5,134,250 A | 7/1992 | Caveney et al. | |
| 5,206,972 A | 5/1993 | Nudelmont et al. | |
| 5,304,736 A | 4/1994 | Halfacre | |
| 5,401,905 A | 3/1995 | Lesser et al. | |
| 5,433,516 A * | 7/1995 | Beals et al. ............ 312/257.1 |
| 5,523,529 A | 6/1996 | Holliday | |
| 5,709,249 A | 1/1998 | Okada et al. | |

(Continued)

FOREIGN PATENT DOCUMENTS

EP    0315023 A3    5/1989

(Continued)

*Primary Examiner*—Dhiru R Patel
(74) *Attorney, Agent, or Firm*—Foley & Lardner LLP (57) ABSTRACT

A wire management system including a channel having a plurality of alternating retention tabs extending inwardly from the side edges of the channel under which wires or cables may be laced. The channel defines a plurality of openings adapted to receive screws for attachment of the channel to a desired surface. Each of the tabs defines an opening therethrough which is adapted to receive a pin extending from a cover which is adapted to be placed over the channel with the pins being received within the openings in an interference fit which allows the cover to be detachable.

14 Claims, 5 Drawing Sheets

U.S. PATENT DOCUMENTS

| | | |
|---|---|---|
| 5,732,747 A | 3/1998 | Holliday |
| 5,802,672 A | 9/1998 | Rohder |
| D404,364 S | 1/1999 | Viklund et al. |
| D413,306 S | 8/1999 | Scherer et al. |
| 5,981,872 A | 11/1999 | Decore et al. |
| 5,995,699 A | 11/1999 | Vargas et al. |
| 6,037,543 A | 3/2000 | Nicoli et al. |
| 6,084,180 A * | 7/2000 | DeBartolo et al. ............ 174/95 |
| D430,543 S | 9/2000 | Rohder |
| 6,140,584 A | 10/2000 | Baldissara |
| 6,188,024 B1 | 2/2001 | Benito-Navazo |
| 6,274,814 B1 | 8/2001 | Iavarone |
| D447,737 S | 9/2001 | Scherer et al. |
| 6,318,680 B1 * | 11/2001 | Benedict et al. ............... 248/49 |
| 6,344,611 B2 | 2/2002 | Ewer et al. |
| 6,378,813 B1 | 4/2002 | Gretz |
| 6,429,374 B2 | 8/2002 | Buard |
| 6,437,247 B1 | 8/2002 | Holliday |
| 6,479,747 B2 | 11/2002 | Bellanger |
| 6,484,360 B1 | 11/2002 | DeBartolo, Jr. et al. |
| 6,501,026 B1 | 12/2002 | Piole et al. |
| D471,878 S | 3/2003 | Dyer et al. |
| 6,600,107 B1 * | 7/2003 | Wright et al. ............ 174/72 A |
| 6,634,605 B2 | 10/2003 | Bernard et al. |
| 6,715,719 B2 | 4/2004 | Nault et al. |
| 6,727,434 B2 | 4/2004 | Jadaud et al. |
| 6,805,514 B2 | 10/2004 | Buard |
| 6,856,505 B1 | 2/2005 | Venegas et al. |
| 6,874,969 B2 | 4/2005 | Jadaud et al. |
| D509,479 S | 9/2005 | DePaola |
| 6,938,337 B2 | 9/2005 | Ewer et al. |
| 6,972,367 B2 | 12/2005 | Federspiel et al. |
| 7,034,227 B2 | 4/2006 | Fox |
| 7,060,893 B1 * | 6/2006 | Villi ........................... 174/507 |
| 7,307,217 B2 * | 12/2007 | Daito ....................... 174/72 A |
| 2003/0155148 A1 | 8/2003 | Lockard |
| 2003/0200712 A1 | 10/2003 | Brownsell |
| 2004/0159750 A1 | 8/2004 | Ferris et al. |
| 2005/0012335 A1 | 1/2005 | Gautier |
| 2005/0217883 A1 | 10/2005 | Ewer et al. |
| 2006/0006291 A1 | 1/2006 | Bernard et al. |
| 2006/0108794 A1 | 5/2006 | Thompson |

FOREIGN PATENT DOCUMENTS

| | | |
|---|---|---|
| EP | 0508192 A3 | 3/1992 |
| EP | 0813012 B | 12/1997 |
| EP | 1113552 A | 7/2001 |
| FR | 2738960 A1 | 3/1997 |
| GB | 881847 | 11/1961 |
| WO | 94/19852 | 9/1994 |

* cited by examiner

WIRE MANAGEMENT SYSTEM

RELATED APPLICATION

This application is based upon Provisional application No. 60/830,489 filed Jul. 11, 2006, and hereby claims benefit of the filing date thereof.

FIELD OF THE INVENTION

The present invention relates to a wire management system and more particularly to such a system which includes a duct or channel within which appropriate cables or wires are housed and which includes a cover which is detachably secured to the channel.

BACKGROUND OF THE INVENTION

As technology increases and the utilization of computers and computer-related equipment as well as entertainment equipment of various types, such as Digital Video Disc (DVD) and Compact Disc (CD) players, audio systems and televisions increase, there is an ever expanding demand and need for systems that will cover and protect data carrying and electrical cables in a building and more specifically, when it is necessary, to extend the cable along an interior wall or floor surface.

A large variety of such systems have been devised to meet this problem. Many such systems use adhesive to attach the channel to the wall while others only use screws and in some events, both adhesive and screws are utilized. In some instances, the channel or duct does not include apertures to receive screws or other fastening apparatus so that the user must drill through the channel in order to affix it to the desired surface.

Where adhesive only is utilized as a means of attachment, such is simple and fast and it makes the installation of the channel easy as long as there is sufficient adhesion between the channel and the wall. However, such can present problems in that if the channel is not properly aligned, it becomes difficult to remove the channel and re-align it. Furthermore, if it is ever necessary to remove the wire channel, if adhesion is in fact good, then either adhesive residue will remain on the wall or the wall material will tear off when the channel is removed.

Where screws are utilized to attach the channeling to the wall, some problems exist. If the wall is of a masonry construction such as concrete, brick, tile or block, then screws are not an option and also screws alone into drywall are marginally effective. Typically, anchors are required so that the screws will have a sufficient holding effect.

It has also been found that the greatest failure of wire management systems occur at the point where the cables or wires exit the channel at either the outlet or equipment end. When such occurs, the wires tend to pull at the wire channel as a result of their own weight, redirection or articulating movement of a piece of equipment to which they are connected. Unless there is sufficient positive anchoring of the channel to the surface at the end of the channel, then as a result of the forces applied through the articulation or movement of the wires or cables, the channel will be pulled away from the surface upon which it is mounted.

Three basic types of wire management systems currently exist in the prior art. The first of these is a cover that does not include a base or channel wherein the cover is screwed directly to the surface upon which it is to be mounted. The wires must be held in place as the cover is secured by screws. This can be awkward and often requires more than one person to install. The second type of wire management system includes a base that is mounted on the surface and thereafter a cover which snaps into the base to retain the wires in the channel. This type of wire management system requires the wires to be perfectly straight so that they can lay side-by-side to allow the cover to snap on. If the wires overlap for some reason and create a high point, then the cover will hit this and will not snap into place. It has been found that it is difficult to hold the wires or cables in place and then snap the cover onto the base at the same time. In addition, the grip strength of the cover is what secures the wires in place and if the grip strength is too weak, the wires will tend to push the cover off and then be exposed or fall out. If on the other hand the grip strength is too strong it makes it extremely difficult to remove the cover if changing wires is ever necessary. The third type of prior art product is one which includes a base and cover that are manufactured as one piece. When attached to the desired surface, the wires are then positioned by pushing them inside and the cover is snapped shut. This product has similar negative issues to it as the separate base and cover design.

There thus exists a need for a wire management system which may be easily installed upon the desired surface and which includes a channel having means for retaining the wires or cables securely in place within the channel irrespective of the presence of a cover. There should also be included a cover which can be detachably secured to the base to provide protection and to cover the wires for esthetic reasons but which may be easily detached for access to the wiring or cables should such be required.

SUMMARY OF THE INVENTION

The present invention includes a wire management system, for cables or wires carrying data or electrical energy for extension along a wall or floor surface which comprises a channel member adapted for attachment to the surface and which channel members include a plurality of inwardly directed retention tabs extending from each side edge thereof with each retention tab defining an opening therethrough, a cover adapted to fit over the channel with the cover including a plurality of pins extending toward the channel and spaced to be received within said openings in a detachable interference fit to removably hold the cover in place over the channels.

In a more specific aspect of the present invention the retention tabs may be disposed in an alternating manner from each side edge of the channel member and the channel member may further include a plurality of spaced apart loops disposed adjacent but spaced inwardly from each side edge with the loops adapted to receive ties to secure the cables in position within the channel.

DETAILED DESCRIPTION

The wire management system of the present invention includes a base and cover design which does not rely upon the cover to hold the cables in place. The cover is used to protect the cables or wires and otherwise is strictly cosmetic. The base or channel includes alternating retention tabs extending inwardly from the side edges thereof under which the cables or wires are laced as they are positioned within the channel or base. The channel is large enough to hold the typical installation of cables or wires. The height is such as to accommodate a typical RF connector should a cable line need to be spliced mid-run. Incorporated within the base are loops positioned longitudinally therealong which are adapted to receive ties which may encircle the wires or cables to more positively secure them into the channel. The cover is installed with a push-on pin and receptacle system. This attachment allows easy installation and removal and allows the cover to adjust in or out along the wall surface independent of the base until the edge of the cover touches the surface creating a cleaner look for uneven wall conditions. The base or channel is provided with mounting options which include both adhesive and screws and is formed with apertures through which the screws may pass and will also permit the utilization of anchors for the screws should such be desired. The adhesive which is utilized is double-surface adhesive which includes a cover over the adhesive so that a small amount of the adhesive may be exposed to position the base on the wall in the desired manner and retained there while inserting screws. As a result, if the base or channel is accidentally installed in a unacceptable manner, it may relatively easily be removed from the surface and repositioned prior to inserting the screws thereby minimizing any removal damage. The system of the present invention also includes a terminating member which may be secured to the end of the base or channel where the wires and cables will exit and is designed to be firmly attached to the surface with screws and anchors to provide the best possible holding power for the end of the wire management system so that it will not pull away from the surface to which it is attached even though forces may be applied to the wires or cables.

Figure 1:
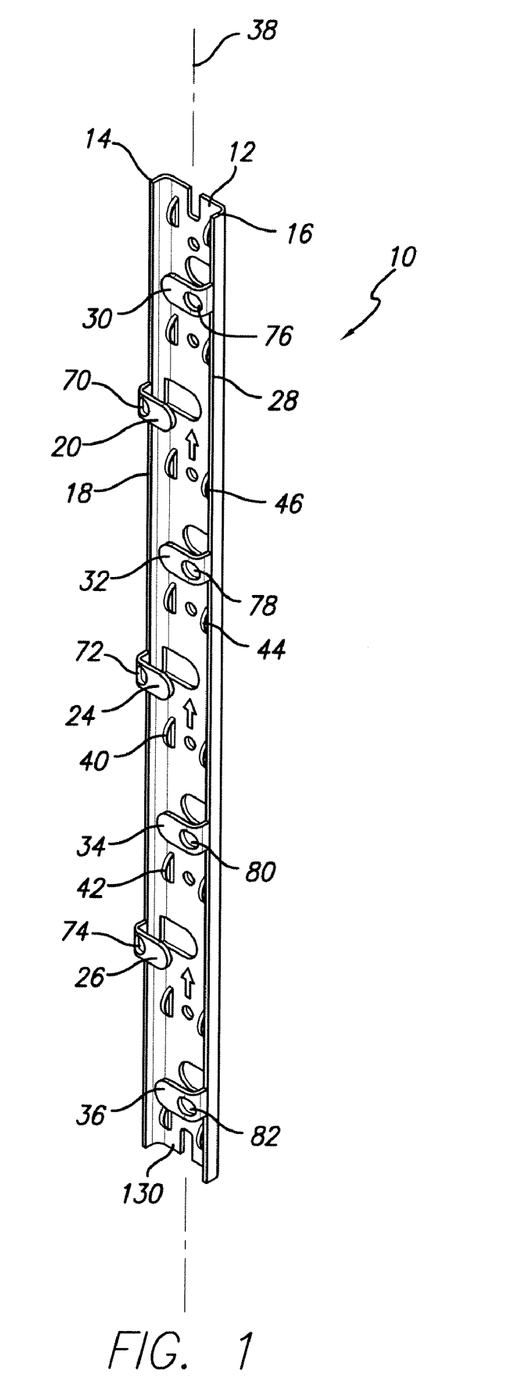
FIG. 1 is a front perspective view of a base or a channel adapted to hold cables and/or wires in accordance with the principles of the present invention.

Referring now to the drawings and more particularly to FIG. 1. There is illustrated a channel member 10 having a base 12 which is constructed essentially as a planar member having sides 14 and 16 extending therefrom. Along the edge 18 of the side 14, there is provided a plurality of inwardly-directed retention tabs, 20, 24 and 26. Along the edge 28 of the side 16, there is provided a plurality of inwardly directed retention tabs, 30, 32, 34 and 36. As is evident from a consideration of the channel in FIG. 1, the inwardly-directed retention tabs are disposed alternately along the longitudinal axis 38 of the channel member 10. The retention tabs are positioned so that when wires or cables are disposed along the channel 10, they may be laced under the retention tabs to thereby hold the wires or cables in place without the necessity of a cover being secured to the channel 10.

As is also shown in FIG. 1, there is provided along each side edge of the planar base 12, a plurality of loops such as those shown at 40 and 42 on the left side of the planar base 12 as viewed in FIG. 1 and 44 and 46 on the right side thereof. As is clearly illustrated in FIG. 1, these loops are positioned between the opposed alternating retention tabs such as, for example, 20 and 32. The loops are adapted so that a wire tie may be inserted underneath each of the loops and over the bundle of cables or wires (not shown) disposed within the channel 10 to more securely hold the cables or wires in place should such be desired.

Figure 2:
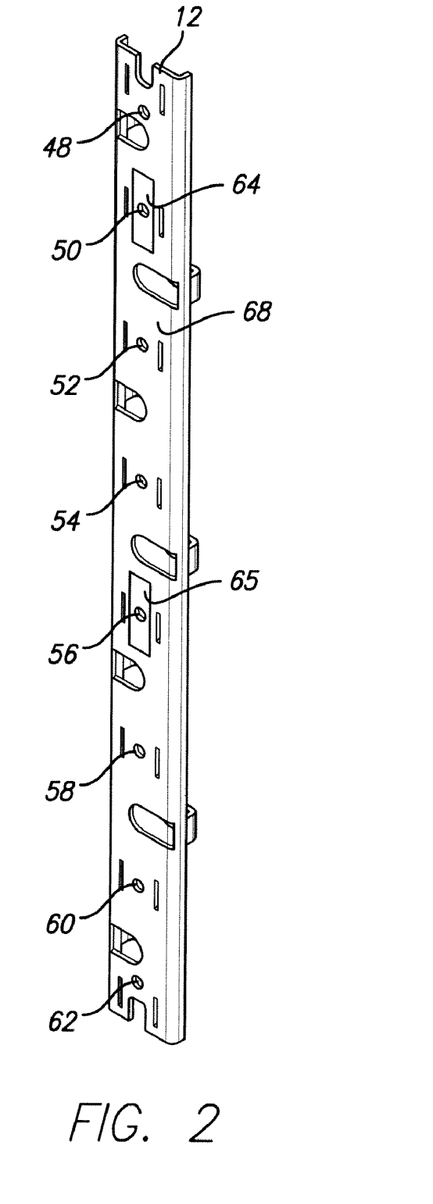
FIG. 2 is a rear perspective view thereof.

As illustrated more clearly in FIG. 2, the planar base member 12 defines a plurality of apertures, 48 through 62, which are adapted to receive screws that may be passed through the apertures or through selected ones of the apertures as may be desired to secure the channel 10 to a surface such as a wall or a floor. In addition thereto, strips of doubled-sided adhesive such as shown at 64 and 66 may be disposed along the surface 68 to assist in securing the channel 10 to the surface on which it is to be attached. Although only two such strips of double-sided adhesive are illustrated at 64 and 68, it should be understood that any number of such strips of adhesive may be disposed along the surface 68 or alternatively a continuous strip of adhesive may extend along the entire length of the planar base 12. If desired, only a small portion of the protective covering on the adhesive member may be removed to allow temporary positioning of the channel 10 to hold it in place while screws are being positioned in one or more of the openings, 48 through 62, to more permanently secure the channel 10 in place on the desired surface.

As is illustrated in FIG. 1, each of the inwardly directed retention tabs, 20, 24, 26, 30, 32, 34 and 36, defines an orifice 70 through 76, respectively. This orifice is utilized for attachment of a cover over the channel 10 once it is positioned in place and the wires or cables are threaded through and laced underneath the inwardly-directed retention tabs. Such will become more evident from the description which follows.

Figure 3:
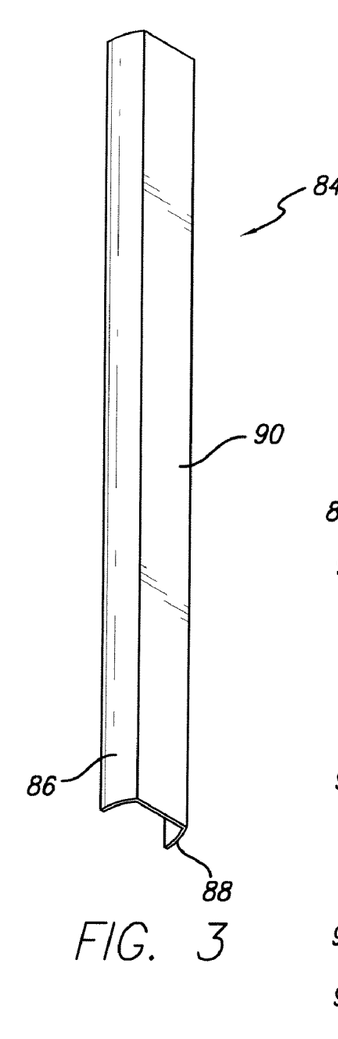
FIG. 3 is a front and top perspective view of a cover for the base.
Figure 4:
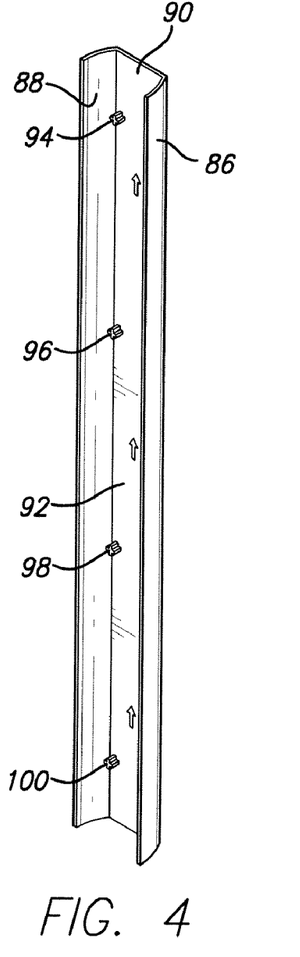
FIG. 4 is a rear perspective view thereof.
Figure 5:
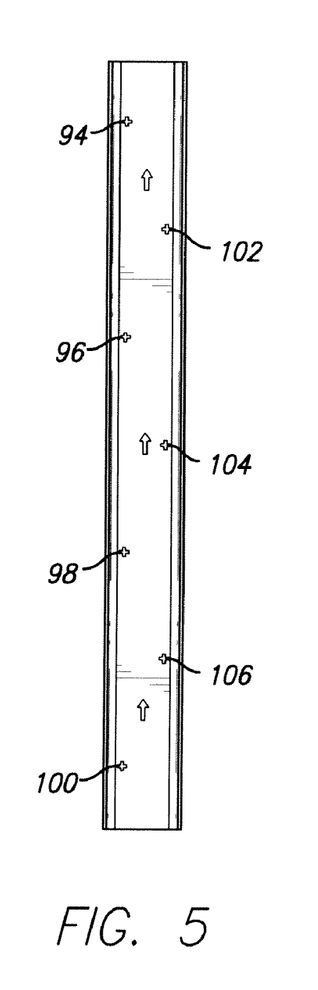
FIG. 5 is a bottom view thereof.

Referring now more particularly to FIGS. 3 through 5, there is illustrated a cover 84 which is formed in a generally U-shaped configuration, having a pair of side arms, 86 and 88, extending angularly outwardly from a top 90. Extending outwardly from the bottom surface 92 of the top 90 are a plurality of pins 94 through 106. These pins are disposed and positioned along the surface 92 and adjacent the side edges of the top 90 so as to be received by the orifices in the inwardly-directed retention tabs as above described. For example, the pins 94, 96, 98 and 100 would be received within the orifices 76, 78, 80 and 82, respectively, as shown in FIG. 1. At the same time, pins 102, 104 and 106 would be received within the orifices 70, 72, and 74. As shown in FIGS. 4 and 5, the pins 94 through 106 are formed so as to have a plurality of outwardly-extending fingers, the distal edges of which engage the orifices in the inwardly-directed retention tabs in a detachable interference fit to removably hold the cover in place over the channel 10. The pins as illustrated have a cruciform cross-section, but it should be recognized that other configurations may be used, including three or more arms or even a solid cylindrical member. It should be recognized by those skilled in the art that the cover 84 is primarily cosmetic in that it covers up the structure of the channel as above described and illustrated in FIGS. 1 and 2, and will also act to shield the cables or wires from possible damage by items striking the same or from debris, dust and the like which may otherwise settle upon the wires or cables. As result of the construction of the side arms 86 and 88, and the manner in which the pins interact with the orifices in the retention tabs, the cover 84 may be adjusted perpendicular to the axis 38 in a manner such that the side edges of the arms 86 and 88 will engage the surface adjacent the channel 10 and thus compensate for any irregularities in that surface and provide a more pleasing visual appearance for the wire management system.

Although in the description thus far given and in the illustrations there is only a single segment of channel and cover, it should be understood by those skilled in the art that there may be a plurality of such sections or segments laid end-to-end to accommodate any length of wires and/or cables which are to be routed along a pre-determined path. It should also be recognized that even though the segments or sections of the cover and channel are provided in a pre-determined length, that they may be cut off if such is desired. Such is facilitated by having the channel and the cover molded from plastic material such, for example, as polyvinylchloride or polypropylene or any other similar materials.

Figures 6, 7, 8, 9:
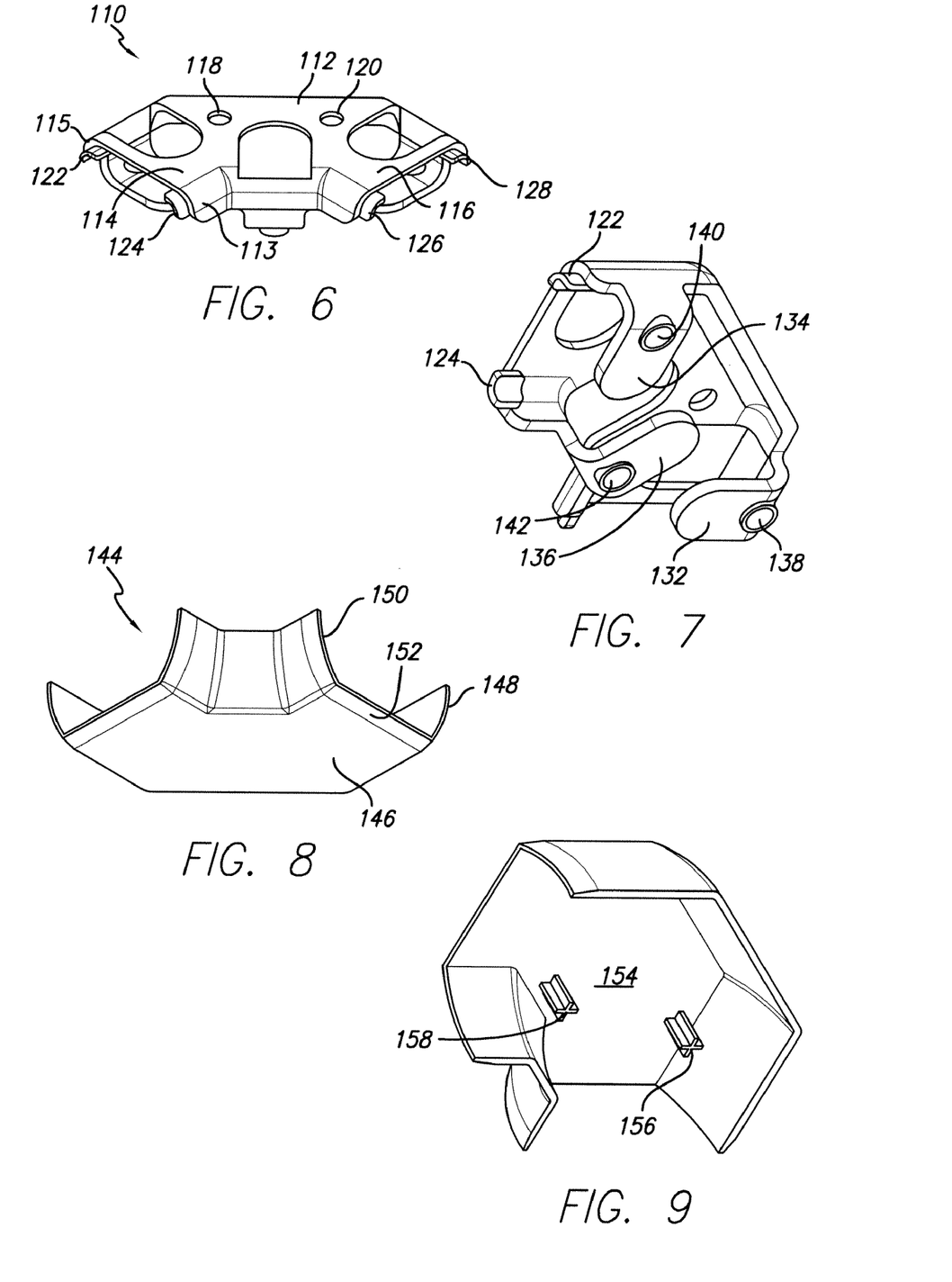
FIG. 6 is a top perspective view of a 90° routing portion of a base member.
FIG. 7 is a bottom perspective view thereof.
FIG. 8 is a top perspective view of a cover for the 90° routing member.
FIG. 9 is a bottom perspective view thereof.

It will be recognized by those skilled in the art that when wires or cables are routed it may be required that they be passed through angles to be routed to the desired termination. As shown in FIGS. 6 though 9, there is illustrated a 90° turn routing apparatus which may be connected to the channels as shown in FIGS. 1 and 2 and also will accommodate an appropriate cover and interface with the cover as illustrated in FIGS. 3 though 5. Although a 90° router is illustrated, it should be understood that angular routers of any desired angle may be utilized. As shown in FIGS. 6 and 7, there is a channel 110 having a base 112 which accomplishes a 90° turn between the end 114 and the end 116 thereof. A pair of sides 113 and 115 extend from the base. The base 112 defines a pair of orifices 118 and 120 which are adapted to accommodate screws for attachment of the member 110 to the desired surface. As above described, the base 112 may have a double-sided adhesive (not shown) attached thereto to adhesively secure the same to the desired surface. As is illustrated, the end 114 includes a pair of curved adapters 122 and 124 while the end 116 includes a pair of such adapters 126 and 128. The adapters are configured to be received in the ends of the channel 10 as shown in FIG. 1. For example, the adapters 126 and 128 would be received internally of the arms 14 and 16, and would be inserted at the corner as shown at 130 in FIG. 1. A similar arrangement would be accommodated for the adapters 122 and 124 for an additional channel such as that shown in FIG. 1. Thus, one channel would mate with the adapters 126 and 128 while another channel would mate with the adapters 122 and 124 to thus provide a continuous run through a 90° angle within which cables or wires could be routed.

As shown in FIG. 7, the member 110 includes inwardly-directed retention tabs 132, 134 and 136, which define orifices 138, 140, and 142 respectively. The retention tabs 132 through 136 provide the same function as the inwardly-directed retention tabs on the channel 10 and the orifices 138 through 142 function precisely the same as the orifices in the inwardly-directed retention tabs as shown in FIG. 1 and above described.

Referring now more particularly to FIGS. 8 and 9, there is shown a cover 144 which is adapted to be received on the member 110 and includes a top 146 having a pair of downwardly-depending arms 148 and 150. As is shown at 152, each terminus of the cover 144 has a reduced thickness so that it is received within the end of the cover 84 in FIG. 3 to thus provide a pleasing and continuous surface of a cover for the channel. The inner surface 154 of the cover 144 includes downwardly-extending pins 156 and 158 which are constructed in the same manner as the pins referred to with regard to the cover 84. These pins, 158 and 156, for example, would be received within the orifices 138 and 142. A similar pin (not shown) would also be received within the orifice 140. This allows the cover 144 to be detachably secured by the interference fit as above described.

Figure 10:
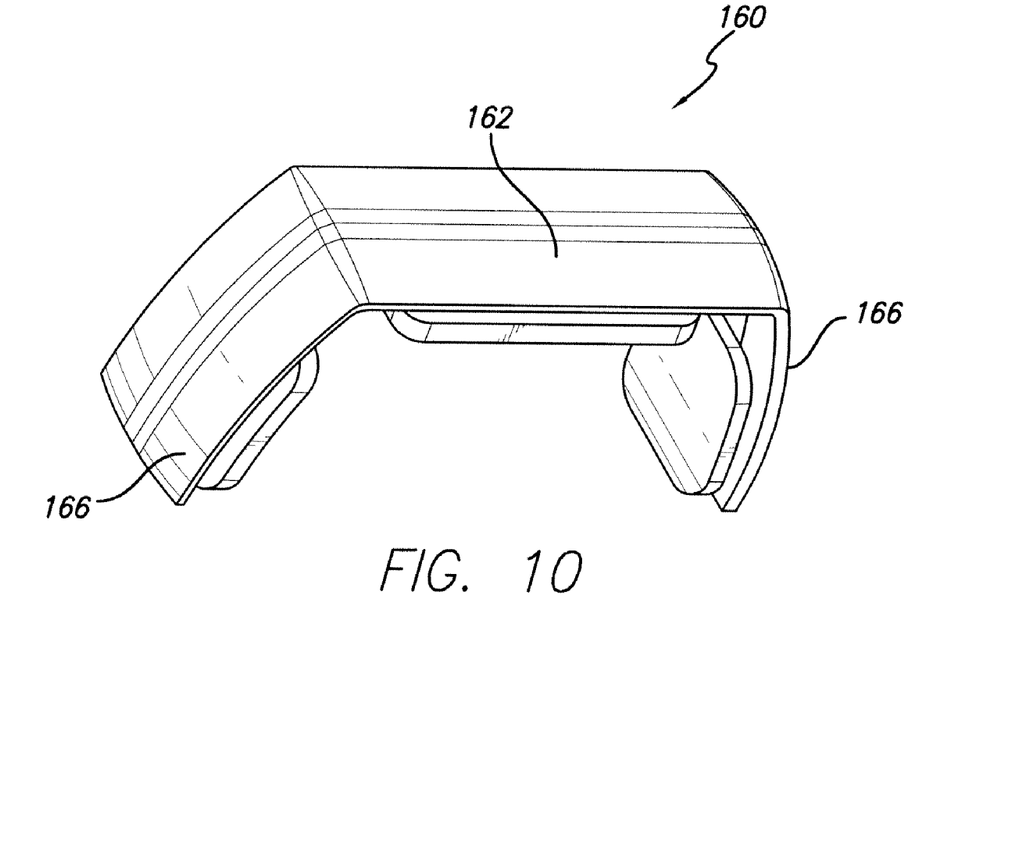
FIG. 10 is a top perspective view of a coupling member for joining two consecutive cover members.
Figure 11:
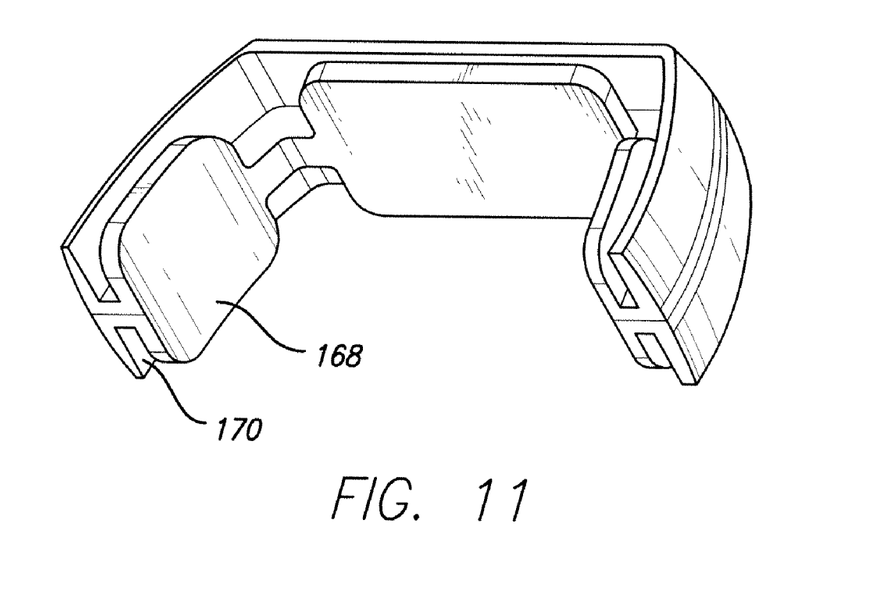
FIG. 11 is a bottom perspective view thereof.

As above described, it may be desirable to have a plurality of channels 10 and covers 84 to cover a routing of wires or cables. When such occurs, it is necessary to have a coupling member to provide a continuous pleasing appearance insofar as the adjoining covers are concerned. Such is shown in FIGS. 10 and 11. As is therein illustrated, such a coupling 160 has a top 162 with downwardly-depending arms 164 and 166 which conform essentially to the shape of the cover 84. Spaced inwardly from the top and the arms but joined thereto is a web 168 which defines a groove 170 which extends along the length of the top 162 and the arms 164 and 166 and on both sides of the coupling 160. The groove 170 is adapted to receive the ends of adjacent covers 84 to thus provide a continuous pleasing appearance of the base and the cover which accomplishes the routing of the wires or cables.

Figures 12, 13, 14, 15:
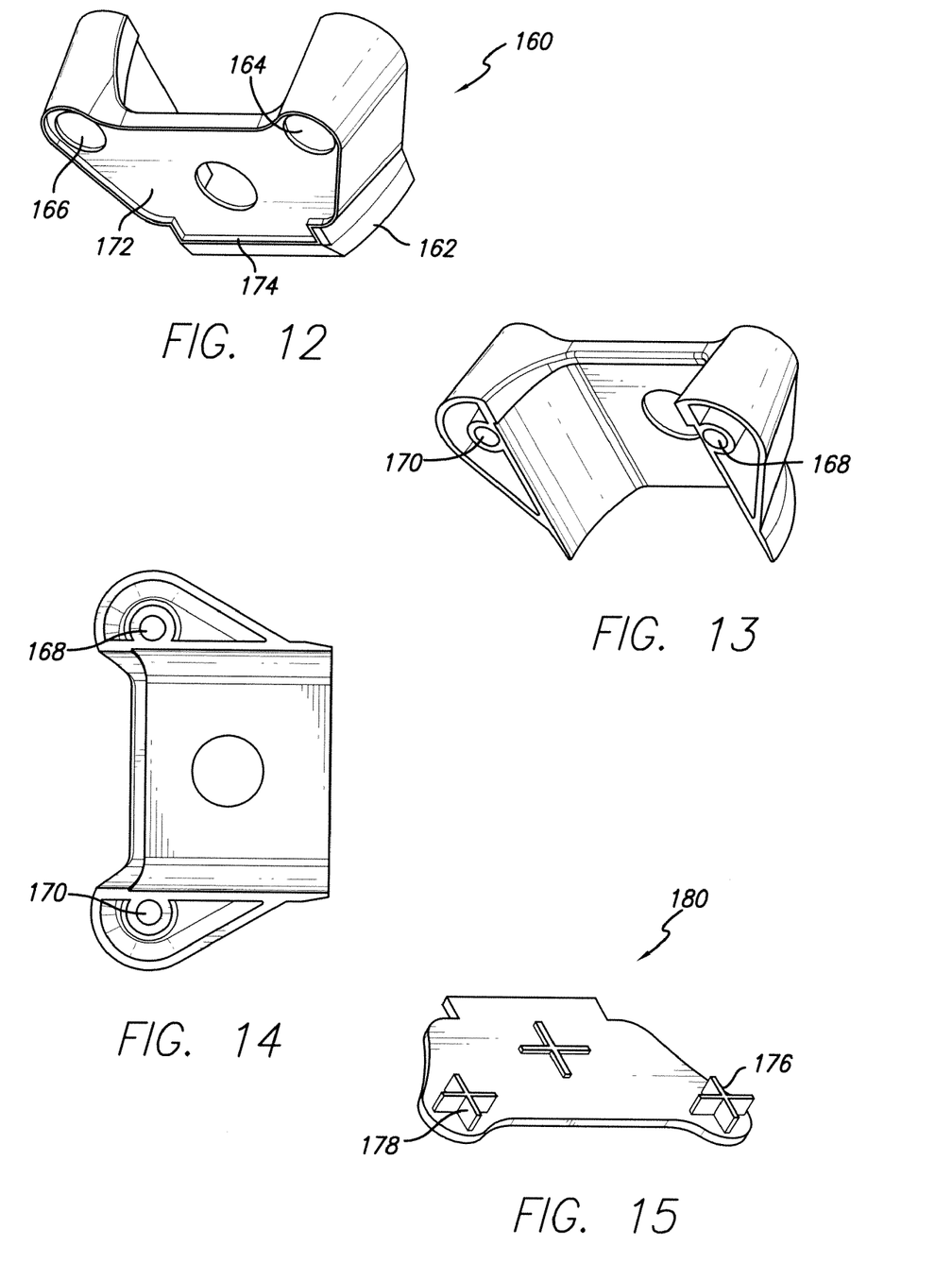
FIG. 12 is a top perspective view of a termination member for the wire management system of the present invention.
FIG. 13 is a bottom perspective view thereof.
FIG. 14 is a bottom view thereof.
FIG. 15 is a bottom perspective view of a cover for the termination members shown in FIG. 12.

As above indicated, one of the primary problems encountered in wire management systems is that where the channel terminates and the wires or cables exit, stresses are applied as a result of the weight of the wires or the movement of apparatus through which the wires are attached. Such traditionally causes the wire management system to separate from the surface to which it is attached thus creating difficulty, nuisance and possible damage to the surface. As is shown in FIGS. 12 through 14, the present invention includes a terminating member 160 which is adapted at its end 162 to fit within and mate with the end of the cover 84. The terminus provides openings 164 and 166 that provide access to the apertures 168 and 170 through which screws are positioned to firmly attach the terminal member 160 to the surface upon which the wire management system is mounted. An appropriate plate or other cover member may be inserted on the top surface 182 into the space 172 defined by the peripheral ridge 174 to cosmetically cover the openings 164 and 166 and provide a pleasing finished appearance. Such a cover is shown in FIG. 15 which illustrates in perspective the bottom portion of such a cover. It will be recognized that this cover includes pins 176 and 178 which would be received within the openings 164 and 166 to retain the cover 180 in place within the space 172.

There has thus been described a wire management system which employs a channel and cover design which may be easily attached to a surface upon which wires or cables are to be routed and which provides alternating retention tabs that the wires or cables are laced under in addition to loops through which ties may be passed to more securely retain the cables or wires in place. The cover is retained in place on the channel by a pin and receptacle system which allows easy installation and removal of the cover should such be desired.

What is claimed is:

1. A wire management system for electrical cables for extension along a wall or floor surface comprising:

a plurality of channels each adapted for attachment to a surface, each of the plurality of channels having a plurality of inwardly-directed retention tabs extending from side edges thereof, each retention tab defining an opening therethrough; and a cover adapted to fit over one of said channels, said cover including a plurality of pins extending toward the one of said channels and spaced to be received by said openings in a detachable interference fit to removably hold said cover in place over the one of said channels.

2. A wire management system as defined in claim 1, wherein said retention tabs are disposed in an alternating manner from the side edges of each of the plurality of channels.

3. A wire management system as defined in claim 1, wherein each of the plurality of channels further include a plurality of spaced apart loops disposed adjacent but spaced inwardly from the side edges of each of the channels, said loops adapted to receive ties to secure said electrical cables in position in one of said channels.

4. A wire management system as defined in claim 1, wherein said pins each are formed with a plurality of outwardly extending fingers the distal ends of which engage the opening.

5. A wire management system as defined in claim 1, wherein said pins are cruciform in cross section.

6. A wire management system as defined in claim 1, wherein said cover is generally U shaped and includes a top and a pair of side arms extending angularly outwardly there from, said top having a bottom surface which faces one of said channels, said pins extending outwardly from said bottom surface.

7. A wire management system as defined in claim 1, which further includes an angular router having a base with a side extending from each edge of the base and first and second ends, the angular router having a plurality of inwardly directed retention tabs extending from the sides, each of said retention tabs defining an orifice therein, the first and second ends configured to allow said angular router to mate with one of said channels disposed adjacent at least one of the first and second ends.

8. A wire management system as defined in claim 7, wherein said means for mating includes a curved adapter extending from each of said first and second ends, each said curved adapter being received within one of said channels disposed adjacent said first and second ends.

9. A wire management system as defined in claim 8, wherein said angular router further includes a cover having first and second ends and an inner surface and formed with an angle substantially the same as said angular router base, a plurality of pins extending from said inner surface, each of said pins being received within an orifice defined by one of said retention tabs.

10. A wire management system as defined in claim 9, wherein said first and second ends of said router cover include a reduced dimensional region, said reduced dimensional region being received within the cover for one of said channels disposed adjacent said first and second ends.

11. A wire management system as defined in claim 1, which further includes a coupling member having first and second ends and having a top and downwardly depending arms extending from each side edge of said top of the coupling member, a web displaced from but joined to said top of the coupling member and said arms and defining a groove on each of said first and second ends of the coupling member, ends of covers for adjacent channels being received within said grooves.

12. A wire management system as defined in claim 1, which further includes a channel terminating member having a first end and a terminus, said first end having a reduced dimensional region for mating with an end of a cover for one of said channels, said terminus defining a pair of apertures for receiving fastening members to secure said channel terminating member to said surface, and a pair of openings communicating with said pair of apertures to provide access thereto.

13. A wire management system as defined in claim 1, A wherein said channel terminating member includes a top surface surrounded by a peripheral ridge defining a space, a cover plate received within said space to obscure said pair of openings.

14. A wire management system as defined in claim 13, wherein said plurality of pins comprises a pair of pins extending from the cover, said pair of pins being received within said pair of openings to secure said cover plate in place.

* * * * *